May 4, 1954 L. C. PARKER 2,677,239
WINDSHIELD WIPER FOR AUTOMOTIVE VEHICLES AND THE LIKE
Filed Nov. 24, 1950

WITNESS:
Esther M. Stockton

INVENTOR.
Leland C. Parker
BY
Clinton S. Janes
ATTORNEY

Patented May 4, 1954

2,677,239

UNITED STATES PATENT OFFICE 2,677,239

WINDSHIELD WIPER FOR AUTOMOTIVE VEHICLES AND THE LIKE

Leland C. Parker, Elmira, N. Y., assignor to Bendix Aviation Corporation, a corporation of Delaware Application November 24, 1950, Serial No. 197,394

7 Claims. (Cl. 60—54.6)

The present invention relates to windshield wipers for automotive vehicles and the like, and more particularly to improved operating and controlling means therefor.

It is an object of the present invention to provide a novel power element for windshield wipers which is efficient and reliable in operation and simple and economical in construction.

It is another object to provide such a device which is entirely independent of the power plant of the vehicle.

It is another object to provide such a device which exerts only a predetermined force on the wiper blade, so that if the blade is stuck or frozen there is no damage to the operating mechanism.

It is another object to provide such a device in which if the wiper blade sticks, no energy is expended in abortively attempting to move the blade.

Further objects and advantages will be apparent from the following description taken in connection with the accompanying drawing in which.

Figure 1:
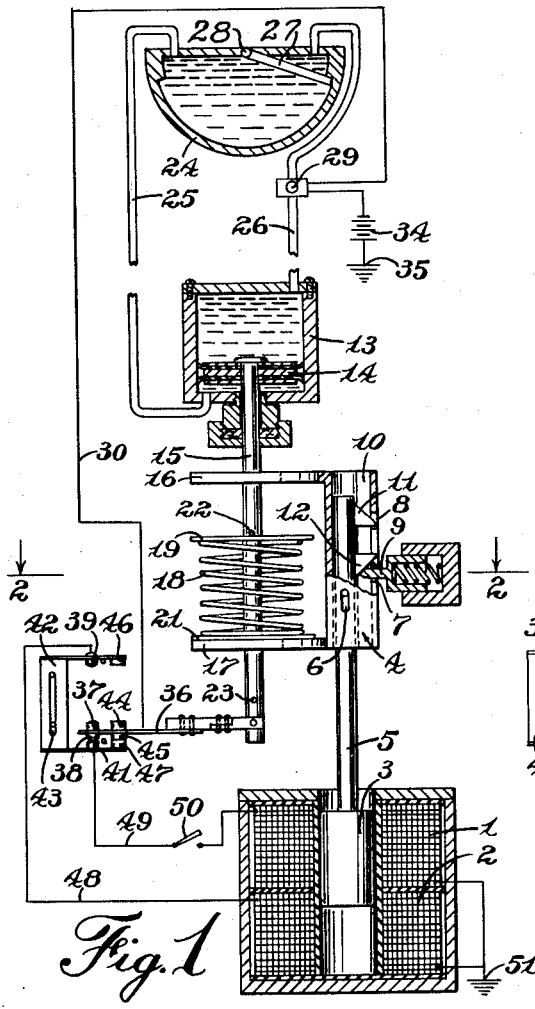
Fig. 1 is a semi-diagrammatic illustration of a preferred embodiment of the invention showing the parts in the positions assumed at the start of a stroke of the windshield wiper blade.

In Fig. 1 of the drawing there is illustrated a pair of coaxially arranged solenoids 1 and 2 traversed by a plunger 3 of magnetic material adapted to be reciprocated by the alternate energization of the solenoids. A slidable yoke member 4 is arranged to be traversed by the extended portion 5 of plunger 3, and a lost motion connection indicated at 6 is arranged to transmit the longitudinal motion of the plunger to the yoke. The yoke 4 is provided with a pair of recesses 7 and 8 into which a spring pressed detent 9 is arranged to project when the recesses come into alignment with the detent at the opposite ends of the stroke of the yoke. The detent thus engages and holds the yoke at the ends of its stroke.

Means are provided for retracting the detent by initial movement of plunger 3 so as to release the yoke and allow it to move with the plunger. As here shown, this means comprises cam projections 11, 12 on the stem 5 of plunger 3 which extend into a slot 10 in the yoke, and are so positioned as to engage the end of the detent 9 and release it from the recesses 7, 8 in the yoke, such releasing movement being permitted by the lost motion connection 6 between the yoke and plunger.

A hydraulic pump cylinder 13 is arranged adjacent the yoke 4 and is provided with a piston 14 rigidly attached to a piston rod 15 which traverses the arms 16, 17 of the yoke. Spring means for actuating the piston rod from the yoke is provided in the form of a compression spring 18 located between the arms of the yoke having thrust plates 19, 21 at its ends adapted to be engaged by the yoke arms. Pins 22, 23 fixedly mounted in the piston rod 15 are also adapted to engage the thrust plates 19, 21, the arms 16, 17 being forked to permit the pins to pass freely therethrough.

A hydraulic motor 24 in the form of a segment of a hollow cylinder is connected by conduits 25, 26 to the opposite ends of the pump cylinder 13, and has an operating vane 27 pivotally mounted at 28 on the axis of the cylinder so as to be oscillated by the reciprocation of the piston 14 of the pump.

A valve 29 is located in the conduit 26 for the purpose of regulating the speed of oscillation of the motor vane. The element 29 preferably includes both the valve for controlling the flow of liquid through the conduit 26 and a switch for controlling the flow of current from the battery through the lead 30, as indicated in Fig. 1 of the drawing, the arrangement being such that the switch is closed by the initial opening movement of the valve.

Figure 4:
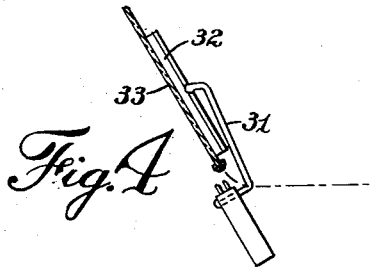
Fig. 4 is a detail on a reduced scale showing a side view of the hydraulic motor and windshield wiper mechanism.

The motor shaft 28 has fixed thereon an arm 31 (Fig. 4) carrying a wiper blade 32 adapted to bear on and wipe the surface of the windshield 33 while the motor is in operation.

Means for selectively energizing the solenoids 1, 2 to cause reciprocation of the plunger 3 is provided comprising a battery 34 which is grounded at 35 and connected by the lead 30 to a movable contact blade 36 mounted on the end of the piston rod 15. Blade 36 carries a pair of contacts 37, 38 adapted to engage contacts 39, 41 respectively mounted on a slidable carrier 42 having a limited amount of longitudinal movement, as indicated at 43. The blade 36 also carries a pair of small permanent magnets 44, 45 adapted to engage armatures 46, 47 respectively mounted adjacent contacts 39, 41 so as to hold the contacts closed for an interval during the sliding movement of carrier 42.

Contact 39 is connected by a lead 48 to the solenoid 2, and contact 41 is connected by a lead 49 and switch 50 to the solenoid 1; both solenoids being grounded as indicated at 51 to complete their actuating circuits.

In Fig. 1 of the drawing the plunger 3 is shown in its upper position responsive to actuation of the solenoid 1 by closure of switch 50 and contacts 38, 41. The yoke 4 is consequently in its upper position in which it is locked by the detent 9. The spring 18 is compressed against the pin 22 in the piston rod 15 by the arm 17 of the yoke, which accordingly applies pressure to the liquid in the pump cylinder 13 above the piston 14. If now the valve 29 is opened to permit passage of liquid through the conduit 26 the vane 27 of the motor 24 will oscillate toward the left and correspondingly move the windshield wiper blade.

Figure 3:
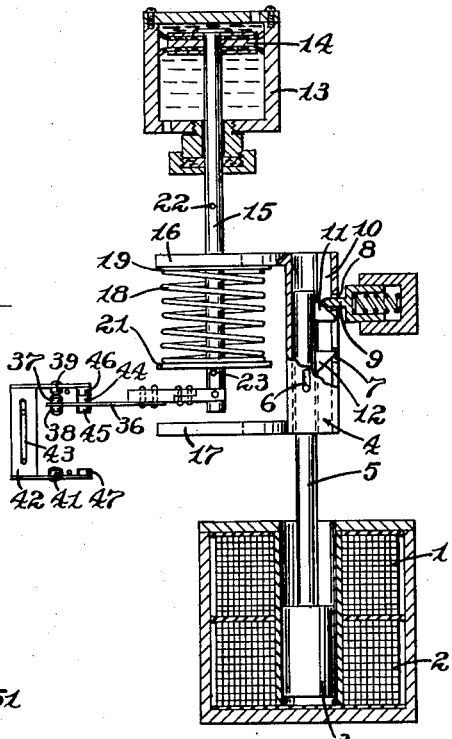
Fig. 3 is a view similar to Fig. 1 showing the parts in their positions at the start of the opposite stroke of the windshield wiper.
Figure 5:
Fig. 5 is a section taken substantially on the line 5—5 of Fig. 2.
Figure 2:
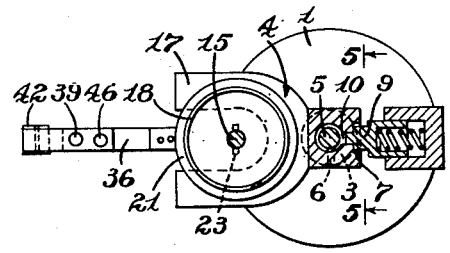
Fig. 2 is a section taken substantially on line 2—2 of Fig. 1.

The initial upward movement of the piston rod 15 as permitted by the opening of valve 29 opens contacts 38, 41, thus deenergizing solenoid 1. The movement of the motor and wiper blade proceeds by the expansive force of spring 18 until the piston rod 15 reaches the upper end of its stroke, at which time contact 37 engages contact 39, causing energization of solenoid 2. The plunger 3 is thereby drawn downward, its initial movement causing the cam member 12 to raise the detent 9 out of the recess 7 whereupon the plunger draws the yoke 4 downwardly, thus compressing spring 18 against the pin 23 of the piston rod 15, as illustrated in Fig. 3, the yoke being retained in this position by entry of the detent 9 into the recess 8 of the yoke. Downward movement of the piston rod 15 is thus initiated, contacts 39, 37 being held closed for a short period by the attraction of the magnet 44 for the armature 46, thus ensuring completion of the stroke of the yoke member 4. The downward movement of piston 14 consequently reverses the oscillating movement of the motor vane 27 which then proceeds at a speed controlled by the opening of the valve 29.

Due to the almost instantaneous action of the plunger 3, and yoke 4 in cocking the spring 18, it will be appreciated that the expenditure of electrical energy is of very short duration. Moreover, if the wiper blade should stick or be frozen, the solenoid contacts are held open so that no expenditure of electrical energy will take place. If the blade should stick at the end of its stroke with the contacts closed, the cocking action of the spring 18 by closure of the valve switch 29 will energize the corresponding solenoid, but this energization will be of short duration inasmuch as the normal slight amount of leakage around the piston 14 and the vane 27 will permit the contacts to open shortly, after which they will remain open unless the switch 29 is allowed to remain closed for a long period of time. In that case the solenoids will be occasionally energized for a short period, but in no case will they be held closed so as to cause any substantial waste of electrical energy.

Opening the switch 50 by the operator prevents energization of solenoid 1 so that the wiper is always "parked" in the position shown in Fig. 1 when it is not in use.

Although but one embodiment of the invention has been shown and described in detail, it will be understood other embodiments are possible and that various changes may be made in the design and arrangement of the parts without departing from the spirit of the invention.

I claim:

1. Operating mechanism for an oscillating member including a slidable plunger, electromagnetic means for reciprocating the plunger, a hydraulic cylinder, a piston slidably mounted therein, a piston rod fixed thereto; means for actuating the piston rod from the plunger including a slidably mounted yoke member, means connecting the yoke member to the plunger, means including a detent for holding the yoke at the ends of its stroke, means including a spring connecting the yoke to the piston rod, and means actuated by the piston rod for controlling said electromagnetic means.

2. Operating mechanism as set forth in claim 1, in which means connecting the plunger to the yoke is so formed as to permit limited lost motion therebetween; and means actuated by movement of the plunger relative to the yoke for releasing the detent so as to permit the yoke to move with the plunger.

3. Operating mechanism as set forth in claim 1 in which the electromagnetic means for reciprocating the plunger comprises a pair of solenoids arranged when energized to draw the plunger in opposite directions, means for selectively energizing the solenoids including a pair of contacts controlling each solenoid, and means actuated by the piston rod for closing one pair of said contacts as it reaches the end of its stroke in each direction.

4. Operating mechanism for windshield wiper comprising a pair of coaxially-arranged solenoids, a magnetic plunger traversing the solenoids, a slidably mounted yoke member, a connection from the plunger to the yoke member for transmitting longitudinal movement thereto, a compression spring between the jaws of the yoke member, a reciprocating rod traversing said jaws having abutments engaging the ends of the spring, and means including contacts actuated by longitudinal movement of the rod for selectively energizing the solenoids to reversely shift the plunger and yoke at the end of each stroke of the rod.

5. An operating mechanism for an oscillating motor comprising a pair of coaxially arranged solenoids, a magnetic core slidably mounted in the solenoids, a slidable yoke member, means for connecting the yoke for reciprocation with the magnetic core through a predetermined stroke, a pump rod, spring actuating means yieldably connecting the yoke to the pump rod permitting the yoke to complete its stroke irrespective of movement of the pump rod, and means controlled by movement of the pump rod for selectively energizing the solenoids to cause reciprocation of the magnetic core and yoke.

6. An operating mechanism for an oscillating motor as set forth in claim 5 including further means for latching the yoke at the end of its stroke, means for deenergizing the solenoid which moved the yoke into latched position, and means responsive to energization of the other solenoid for releasing the latch and moving the yoke through the opposite stroke.

7. An operating mechanism for an oscillating motor as set forth in claim 5 in which the means for selectively energizing the solenoids includes a pair of contacts for each solenoid, and means for holding the contacts closed for a predetermined portion of the stroke of the pump rod caused by closure of the contacts.

References Cited in the file of this patent

UNITED STATES PATENTS

| Number | Name | Date |
|---|---|---|
| 357,374 | Darling et al. | Feb. 8, 1887 |
| 507,671 | Boeklen | Oct. 31, 1893 |
| 696,313 | Cheatham | Mar. 25, 1902 |
| 1,668,278 | Langdon | May 1, 1928 |
| 1,737,649 | Edsall | Dec. 3, 1929 |
| 1,805,082 | Edsall | May 12, 1931 |
| 1,897,075 | Samson | Feb. 14, 1933 |
| 1,904,955 | Schouten | Apr. 18, 1933 |
| 2,283,886 | Henkell | May 19, 1942 |
| 2,298,474 | Ericson et al. | Oct. 13, 1942 |

OTHER REFERENCES

Ser. No. 240,197, Schmidt (A. P. C.), published Apr. 27, 1943.